United States Patent
Debabrata et al.

(10) Patent No.: US 10,981,795 B2
(45) Date of Patent: Apr. 20, 2021

(54) PRECIPITATED SILICA

(71) Applicant: Tata Chemicals Limited, Mumbai (IN)

(72) Inventors: Rautaray Debabrata, Pune (IN); Parida Prabhat Kumar, Pune (IN); Lolage Mayura, Pune (IN)

(73) Assignee: Tata Chemicals Limited, Mumbai (IN)

(*) Notice: Subject to any disclaimer, the term of this patent is extended or adjusted under 35 U.S.C. 154(b) by 200 days.

(21) Appl. No.: 16/065,540

(22) PCT Filed: Dec. 22, 2016

(86) PCT No.: PCT/IB2016/057920
§ 371 (c)(1),
(2) Date: Jun. 22, 2018

(87) PCT Pub. No.: WO2017/109742
PCT Pub. Date: Jun. 29, 2017

(65) Prior Publication Data
US 2020/0115246 A1  Apr. 16, 2020

(30) Foreign Application Priority Data
Dec. 23, 2015 (IN) .......................... 4838/MUM/2015

(51) Int. Cl.
*C01B 33/193* (2006.01)

(52) U.S. Cl.
CPC ........ *C01B 33/193* (2013.01); *C01P 2004/45* (2013.01); *C01P 2004/60* (2013.01); *C01P 2006/12* (2013.01); *C01P 2006/14* (2013.01); *C01P 2006/16* (2013.01); *C01P 2006/19* (2013.01); *C01P 2006/90* (2013.01)

(58) Field of Classification Search
CPC ............. C01P 2006/19; C01P 2006/17; C01P 2006/12; C01P 2006/14; C01P 2006/16; C01P 2004/45; C01P 2004/50; C01P 2004/51; C01P 2004/54; C01P 2004/60; C01P 2004/61; C08L 9/06; C08L 9/00; C08L 21/00; C01B 33/193; C01B 33/00; C01B 33/12; C08K 3/36
See application file for complete search history.

(56) References Cited

U.S. PATENT DOCUMENTS

| | | | |
|---|---|---|---|
| 7,566,433 B2 | 7/2009 | Stenzel et al. | |
| 7,790,131 B2 | 9/2010 | Stenzel et al. | |
| 7,871,588 B2 | 1/2011 | Lindner et al. | |
| 2003/0082090 A1* | 5/2003 | Blume | B60O 1/00 423/335 |
| 2007/0100057 A1* | 5/2007 | Stenzel | B60C 1/0016 524/492 |
| 2012/0041128 A1* | 2/2012 | Kosso | B60C 1/0016 524/493 |

FOREIGN PATENT DOCUMENTS

| | | |
|---|---|---|
| CA | 2403954 A1 | 3/2003 |
| EP | 0 937 755 A1 | 8/1999 |
| EP | 2 262 730 A1 | 12/2010 |
| KR | 101567617 B1 | 11/2015 |
| WO | WO 2009/124829 A1 | 10/2009 |

OTHER PUBLICATIONS

Esch et al—DE4427137, machine translation (Year: 1995).*
International Search Report and Written Opinion dated Mar. 3, 2017 for Application No. PCT/IB2016/057920, 7 pgs.
European Search Report, Supplementary, and Written Opinion dated Jul. 12, 2019 for Application No. EP 16877884.3, 6 pgs.
Indian Office Action, First Examination Report, dated Jan. 18, 2019 for Application No. 4838/MUM/2015, 5 pgs.

* cited by examiner

*Primary Examiner* — Coris Fung
*Assistant Examiner* — Smita S Patel
(74) *Attorney, Agent, or Firm* — Frost Brown Todd LLC

(57) ABSTRACT

A precipitated silica is disclosed. Said precipitated silica has a BET/CTAB in a range of 0.8-1.35; a DBP oil absorption in a range of 240-320 ml/100 g; and a CDBP coefficient (DA) in range of 0.65 to 0.9. The precipitated silica has a micro pore area ranging from 6 to 35 $m^2/g$ and a micro pore volume ranging from 0.01 to 0.06 $cm^3/g$.

15 Claims, No Drawings

PRECIPITATED SILICA

FIELD OF INVENTION

The present disclosure relates to precipitated silica suitable for use as reinforcing filler. Specifically, the present disclosure provides precipitated silica having desired structure, surface morphology, porosity, which could exhibit high dispersibility in an elastomer.

BACKGROUND

Silica is well-known for use as reinforcing filler in vulcanizable rubber mixtures, such as those used to form tyres. The reinforcing fillers used in tyre compounding are critical to achieving the performance requirements and substantially assist in strengthening the rubber network thereof, resulting in a substantial increase in stiffness, tensile strength, and resistance to abrasion. This in effect contributes in increasing the longevity of tyres while reducing the fuel consumption. The silica used in the tyre industry is generally precipitated silica, in particular characterized by its particle size, structure and surface activity.

An essential parameter for characterizing a precipitated silica is the surface area which is determined either by the adsorption of nitrogen (commonly referred to as BET (after Brunauer, Emmett and Teller) surface area) or, by the adsorption of Cetyl trimethyl ammonium bromide (CTAB) on the surface of silica (commonly referred to as CTAB surface area). BET surface area provides total surface area, whereas CTAB surface area provides external surface area of silica. The ratio of said two parameters viz. BET/CTAB provides a measure of microporosity. Pore volume and pore size distribution are also an important of better rubber to filler interaction. Also, total pore volume plays an important role for rubber penetration in the early stage of mixing.

Silica synthesis process follows the condensation of primary particles into aggregates of typical dimensions of 100-200 nm, which are the real reinforcing species in rubber compounds. As the concentration of the aggregate particles increases, an interaction between them leads to the formation of bigger agglomerates. The degree of condensation in aggregates is designated by structure, determines the inter-particle void volume and pore diameter within the aggregates. The measurement of this "structure" is based on the adsorption of dibutyl phthalate (DBP) and is measured by DBP oil absorption value. Another significant parameter which determines the dispersibility of silica is CDBP coefficient ($D_A$). This coefficient is calculated according to the difference in the DBP absorption between the primary uncompressed sample (DBPO) and sample after its compression at 40 MPa (Compressed DBP or CDBP), as shown in formula below:

$$D_A = 1 - (CDBP/DBPO)$$

This coefficient theoretically ranges from 0 to 1, wherein the higher the value of the coefficient, the weaker is the structure of the silica.

The Wk coefficient is the ratio of the peak height of the non-degradable particle, the maximum of which lies in the range of 1.0-100 microns, to the peak height of the degraded particles, the maximum of which lies in the range of <1 micron. The Wk coefficient is therefore a measure of the "degradability" (dispersibility) of the precipitated silica.

It is known that the properties of precipitated silica affect the reinforcement properties thereof. It necessitates the need to identify the characteristic attributes of silica suited for different requirement profile of different applications. Depending on the requirement profile, these properties may vary.

For instance, EP 0 937 755 discloses that precipitated silicas which possess a BET surface area from about 180 to about 430 m$^2$/g and a CTAB surface area from about 160 to 340 m$^2$/g and a BET to CTAB ratio of about 1.1 to 1.3 are particularly suitable as carrier material. However, such a precipitated silica is not meant for application in elastomer and rubber compositions.

US20030082090 discloses that precipitated silica having very different BET (≥135 m$^2$/g) and CTAB surface areas (≥75 m$^2$/g) while remaining above minimum values are particularly suitable as fillers.

Apart from surface area, surface activity of silica, which is usually defined in terms of Sears number influences the properties of silica. Sears number is a measurement of the concentration of silanol groups on the precipitated silica. The silanol groups on the surface of precipitated silica function as potential chemical reaction sites for a coupling reagent, which permit coupling of the silica to the elastomer matrix. The ratio of Sears Number/CTAB surface area provides the concentration of silanol groups for a given level of CTAB surface area.

U.S. Pat. No. 7,566,433 discloses precipitated silica having a relative breadth γ of pore size distribution of 4.0-10.0 (g nm)/ml, a Sears Number of 28-40 ml/(5 g), a Sears Number/CTAB ratio of 0.18-0.28 ml/(5 m$^2$), and CTAB of 100-200 m$^2$/g and suggests that such precipitated silica are particularly suitable as reinforcing fillers. Further, disclosed precipitated silica has a BET/CTAB ratio greater than 1.3 and a zeta potential at pH 5 from −12 to −30 mV. The precipitated silica is obtained by controlling the addition of sulphuric acid such that prevailing alkali number in the reaction medium is 30.0±0.3. Additionally, the process employs organic/inorganic salt, as a result of which it contains residues of Al$_2$O$_3$ ranging from 0.01 to 5%.

U.S. Pat. No. 7,790,131 discloses that highly dispersible silica having BET surface area 200-300 m$^2$/g, CTAB surface area ≥170 m$^2$/g, DBP number 200-300 g/(100 g), and Sears number 23-35 ml/(5 g) are particularly suited for use as a tire filler for utility vehicles, motor cycles and high speed vehicles. The precipitated silica having said properties is obtained by using organic and/or inorganic salt in the aqueous solution of 0.01 to 5 mol/l to get the desired properties.

Thus, although various grades of precipitated silica are available, these silicas have certain limitations which make their application difficult/limited. There is still a need to develop precipitated silica which have a desirable blend of properties and which could exhibit good dispersion and reinforcement when added to an elastomer.

SUMMARY

A precipitated silica is disclosed. Said precipitated silica has a BET/CTAB in a range of 0.8-1.35; a DBP oil absorption in a range of 240-320 ml/100 g; and a CDBP coefficient ($D_A$) in range of 0.4 to 0.9.

DETAILED DESCRIPTION

For the purpose of promoting an understanding of the principles of the disclosure, reference will now be made to embodiments and specific language will be used to describe the same. It will nevertheless be understood that no limitation of the scope of the disclosure is thereby intended, such alterations and further modifications in the disclosed composition and method, and such further applications of the principles of the disclosure therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof. It will be further understood by those skilled in the art that the parameters such as BET surface area, CTAB surface area, CDBP coefficient ($D_A$), DBP oil absorption, Wk coefficient, sears number, have the same meaning as generally understood in the art, unless specifically stated otherwise.

Reference throughout this specification to "one embodiment" "an embodiment" or similar language means that a particular feature, structure, or characteristic described in connection with the embodiment is included in at least one embodiment of the present disclosure. Thus, appearances of the phrase "in one embodiment", "in an embodiment" and similar language throughout this specification may, but do not necessarily, all refer to the same embodiment.

In its broadest scope, the present disclosure relates to silica having high dispersibility in an elastomer matrix. Particularly, the present disclosure relates to silica having:
  a BET/CTAB in a range of 0.8-1.35;
  a DBP oil absorption in a range of 240-320 ml/100 g; and
  a CDBP coefficient ($D_A$) in range of 0.4 to 0.9.

Herein, DBP oil absorption was analyzed in accordance with method ASTM D 1208. Further, BET surface area is determined according to ISO 5794-1/Annex D and CTAB surface area is determined according to ASTM 3765, or NFT 45-007. CDBP is measured according to ASTM D-3493 test, said test being modified to a pressure of 40 MPa.

It has been found that that said combination of physico-chemical parameters brings about an improvement in dispersibility of precipitated silica in the elastomer matrix. Precipitated silica according to the present disclosure has a DBP oil absorption in a range of 240-320 ml/100 g, thereby indicating improved condensation of primary particles into particulate aggregates, upon synthesis of silica. This, in combination with BET/CTAB of close to 1 and the CDBP coeffficient ($D_A$) of 0.4-0.9 indicates low durability of the silica structure which causes the silica to readily disperse in the elastomer matrix.

In accordance with a preferred embodiment, the BET/CTAB of the precipitated silica is in the range of 1.1 to 1.25. In accordance with a further preferred embodiment, the DBP oil absorption of the precipitated silica is in the range of 280-320 ml/100 g. In accordance with a further preferred embodiment, the CDBP coefficient (DA) is in the range of 0.5 to 0.9.

In accordance with an embodiment, the precipitated silica has a BET surface area in a range of 100-250 $m^2/g$. Preferably, the precipitated silica has the BET surface area in the range of 100-170 $m^2/g$.

In accordance with an embodiment, the precipitated silica has a CTAB surface area in a range of 80-230 $m^2/g$. Preferably, the precipitated silica has the CTAB surface area in the range of 130 to 170 $m^2/g$.

In accordance with an embodiment, the precipitated silica has a sears number ($V_2$) in a range of 10 to 30 ml/(5 g). Preferably, the precipitated silica has the sears number ($V_2$) in a range of 10 to 25 ml/(5 g). In accordance with a related embodiment, the precipitated silica has a silanol density measured by a ratio of sears number ($V_2$) and CTAB surface area in a range of 0.16-0.20 ml/(5 $m^2$).

In accordance with an embodiment, the precipitated silica has a Wk coefficient number less than 3. Preferably, the precipitated silica has the Wk coefficient number ranging from 1 to 3.

In accordance with an embodiment, the precipitated silica has an average primary particle size ranging from 8 to 50 nm. Preferably, the precipitated silica has the average primary particle size ranging from 10-30 nm.

In accordance with an embodiment, the precipitated silica has an average particulate aggregate size ranging from 50 to 3000 nm. Preferably, the precipitated silica has the average particulate aggregate size ranging from 50 to 600 nm.

In accordance with an embodiment, the precipitated silica has a micro pore volume ranging from 0.01 to 0.06 $cm^3/g$. Preferably, the precipitated silica has the micro pore volume ranging from 0.01 to 0.02 $cm^3/g$.

In accordance with an embodiment, the precipitated silica has a micro pore area ranging from 6 to 35 $m^2/g$. Preferably, the precipitated silica has the micro pore area ranging from 10 to 25 $m^2/g$.

In accordance with an embodiment, the precipitated silica has a pore diameter ranging from 250 Å to 350 Å. Preferably, the precipitated silica has the pore diameter ranging from 250 Å to 300 Å.

In accordance with an embodiment, the precipitated silica has a moisture loss of 2 to 6% by weight, on drying for two hours at 105° C. Preferably, the precipitated silica has the moisture loss of 2 to 5% by weight, on drying for two hours at 105° C.

In accordance with an embodiment, the precipitated silica has a tapped density in a range of 0.12-0.3 g/cc. Preferably, the precipitated silica has the tapped density in a range of 0.18 to 0.25 g/cc.

In accordance with an embodiment, the precipitated silica has a bulk density in a range of 80-140 g/l. Preferably, the precipitated silica has the bulk density in a range of 100 to 120 g/l.

In accordance with a embodiment, the precipitated silica has a pH value of 6-6.5 (5% in water).

In accordance with an embodiment, the precipitated silica has $SiO_2$ content of greater than 96%. Preferably, the precipitated silica has the $SiO_2$ content of 97%.

In accordance with an embodiment, the precipitated silica has a soluble salt content of less than 0.5 to 1%. Preferably, the precipitated silica has the soluble salt content of less than 0.5%.

In accordance with an embodiment, the precipitated silica has a zeta potential in a range of −20 mV to −50 mV. Preferably, the precipitated silica has the zeta potential in a range of −30 mV to −40 mV.

In accordance with an embodiment, the precipitated silica has an electrical conductivity (4% in water) of less than 1300 µS/cm. Preferably, the precipitated silica has the electrical conductivity (4% in water) in a range of less of 1200 µS/cm.

The precipitated silica according to the present disclosure can be optionally modified with silanes or organosilanes.

A process of preparing the above mentioned precipitated silica is also disclosed. Said process comprises of:
  reacting an aqueous solution of a metal silicate with a mineral acid in the presence of a surfactant solution comprising gelatin and C8-C20 sulfosuccinate blend, at a reaction temperature in a range of about 70 to 100° C. with constant stirring such that a reaction mixture having a pH of about 10±0.3 is obtained;
  optionally, allowing the reaction mixture to age at a temperature in a range of about 70 to 100° C. for a time period in range of 10 minutes to 30 minutes;

adjusting the pH of the reaction mixture to about 4, followed by aging said mixture at a temperature in a range of about 70 to 100° C. for a time period in a range of 10 minutes to 2 hours; and recovering the precipitated silica from the reaction mixture.

In accordance with an embodiment, the surfactant solution is prepared by dissolving gelatin in water followed by addition of C8-C20 sulfosuccinate blend at 50 to 80° C. In accordance with an embodiment, the surfactant solution comprises gelatin and C8-C20 sulfosuccinate blend in a ratio ranging from 1:1 to 1:3, and preferably 1:1.5. For example, the surfactant solution may be obtained by combining 4.5 grams of gelatin with 6.75 ml of C8-C20 sulfosuccinate blend, such as Surfactant-OT 85 AE, commercially available from CYTEC.

In accordance with an embodiment, the metal silicate is selected from a group consisting of an alkali metal silicate, an alkaline earth metal silicate and mixture thereof. Preferably, sodium silicate is used as the metal silicate. The metal silicate can contain from 7-30 wt % $SiO_2$, and preferably 23 wt % $SiO_2$. In accordance with an embodiment, the aqueous solution of metal silicate is prepared by mixing the alkali metal silicate and/or alkaline earth metal silicate with water for a predetermined time period, preferably for 15 minutes, while stirring. In accordance with a related embodiment, the metal silicate has a pH between 11-14, and preferably about 12.5±0.5.

In accordance with an embodiment, the mineral acid is selected from a group consisting of sulphuric acid, hydrochloric acid, nitric acid. In accordance with a related embodiment, the mineral acid has a molarity in a range of 0.1 M to 2 M, and preferably around 0.625 M.

In accordance with an embodiment, the aqueous medium is formed of water only.

In accordance with an embodiment, the reaction of the aqueous solution of metal silicate with the mineral acid is carried out by separately adding the aqueous solution of metal silicate, the mineral acid, and the surfactant solution to an aqueous medium heated up to the reaction temperature. In accordance with an embodiment, a reactor containing the aqueous medium and connected to a heater is simultaneously charged with the aqueous solution of the metal silicate, the mineral acid, and the surfactant solution to carry out aforesaid reaction. In accordance with an alternate embodiment, the reactor containing the aqueous medium and connected to the heater is first charged with the surfactant solution, followed by the addition of the metal silicate and the mineral acid. In accordance with a related embodiment, the surfactant solution is added to the aqueous medium at a temperature lower than the reaction temperature; and the aqueous medium comprising the surfactant solution is then heated till the reaction temperature.

In accordance with an embodiment, the aqueous solution of metal silicate, the mineral acid, and the surfactant solution are added in a continuous manner. In accordance with an alternate embodiment, the addition may be stopped intermittently to allow intermittent aging of the reaction mixture. The intermittent aging may be carried out for 10-30 minutes.

In accordance with an embodiment, the aqueous solution of metal silicate, the mineral acid, and the surfactant solution are simultaneously added to the aqueous medium over a time period in a range of 30 minutes to 2 hours. In accordance with a related embodiment, the addition rate of the metal silicate solution and the mineral acid is such that the metal silicate solution and the mineral acid are in a ratio of about 1:1 (based on volume). The addition rate of the metal silicate solution, and the mineral acid, may further be adjusted to maintain the pH of 10+0.3. In accordance with an embodiment, the surfactant solution is added such that the surfactant solution has a concentration of about 2.25 to 2.5% w/w with respect to the silica content of the metal silicate solution. Preferably, the surfactant solution is added such that the surfactant solution has a concentration of about 2.45% w/w with respect to the silica content of the metal silicate solution. For example, To prepare 450 grams of precipitated silica from 2 kg (1.5 litres) sodium silicate having a total solid content of 32% and silica content of 23%, the surfactant solution comprising 0.98% (i.e. 4.5 grams) of gelatin and 1.47% (i.e. 6.75 ml) of Surfactant-OT 85 AE w.r.t. silica content of sodium silicate is added.

In accordance with an embodiment, the reaction is carried out at the reaction temperature in a range of about 70 to 100° C. Preferably, the reaction temperature is 95° C. In accordance with an embodiment, the reaction mixture comprising metal silicate solution, the mineral acid, and the surfactant solution is continuously stirred. The stirring is carried out at a stirring rate in a range of 50 to 700 rpm. Preferably, the stirring is carried out at 400 rpm.

In accordance with an embodiment, once the reaction mixture has attained the pH of 10±0.3, it is allowed to age at the temperature in a range of about 70 to 100° C. for a time period of 10-100 minutes. Preferably, the aging is carried out for 60 minutes at 95° C.

In accordance with an embodiment, after the completion of the reaction at the pH of 10±0.3, the pH of the reaction is rapidly brought down to the pH of around 4. The pH of the reaction mixture is adjusted to about 4 from 10±0.3 by addition of the mineral acid. In accordance with an embodiment, the pH of the reaction mixture is first adjusted to about 2 from 10+0.3 and then to about 4. The pH of the reaction mixture is adjusted to about 2 from 10±0.3 by addition of the mineral acid and then to around 4 by addition of a base. The base may be any base known to a person skilled in the art. Preferably, the base is sodium hydroxide.

In accordance with an embodiment, the reaction mixture is allowed to age at the pH of about 4 for a time period in a range of 10 minutes to 2 hours. Preferably, the reaction mixture is allowed to age for 1 hour. In accordance with a related embodiment, the aging is carried out at a temperature in a range of 70 to 100° C. Preferably, the aging is carried out at 95° C. In accordance with an embodiment, the aging is carried out while continuously stirring the reaction mixture.

In accordance with an embodiment, the precipitated silica obtained upon completion of reaction is filtered followed by washing. Washing is done to eliminate the by products, such as sodium sulphate, obtained as a result of reaction. Thus obtained precipitated silica is then subjected to a drying step. The drying step may be carried out by spray drying, spin flash drying, or vacuum tray drying. Alternatively, the wet cake is subjected to short-term drying, followed by addition of a dispersing agent in a suitable solvent. The dispersion may then be dried to obtain precipitated silica. In accordance with an embodiment, the dispersion of silica is prepared using a dispersing agent selected from a group consisting of metal salt of saturated and unsaturated fatty esters with long hydrocarbon chain/fatty acids in an appropriate solvent selected from a group consisting of butanol, butanone, toluene and acetone.

The silica according to the present disclosure can be used in tyre rubber, rice roller rubber, shoe sole rubber or any other elastomers. Specifically, the silica disclosed herein is suitable for use as filler in vulcanizable or vulcanized elastomer compositions. The vulcanized elastomer composition can be used for the manufacture of tyre and other rubber products. In accordance with an embodiment, said silica may be used as a reinforcing filler in a quantity in a range of 7 to 90 phr. Any conventional process may be used to form vulcanizable or vulcanized elastomer compositions using the above disclosed silica as reinforcing filler.

Specific Embodiments are Described Below

Such a precipitated silica having:
a BET/CTAB in a range of 0.8-1.35;
a DBP oil absorption in a range of 240-320 ml/100 g; and
a CDBP coefficient ($D_A$) in range of 0.4 to 0.9.
Such a precipitated silica, having the BET/CTAB in the range of 1.1 to 1.25.
Such a precipitated silica, having the DBP oil absorption in the range of 280-320 ml/100 g.
Such a precipitated silica, having the CDBP coefficient (DA) in the range of 0.5 to 0.9.
Such a precipitated silica, having a BET surface area in a range of 100-250 m$^2$/g. Such a precipitated silica, having a CTAB surface area in a range of 80-230 m$^2$/g. Such a precipitated silica, having a sears number (V2) in a range of 10 to 30 ml/(5 g).
Such a precipitated silica, having a Wk coefficient number less than 3.
Such a precipitated silica, having an average primary particle size ranging from 8 to 50 nm.
Such a precipitated silica, having an average particulate aggregate size ranging from 50 to 3000 nm.
Such a precipitated silica, having a micro pore volume ranging from 0.01 to 0.06 cm$^3$/g.
Such a precipitated silica, having a micro pore area ranging from 6 to 35 m$^2$/g.
Such a precipitated silica, having a pore diameter ranging from 250 Å to 350 Å.
Such a precipitated silica, having a moisture loss of 2 to 6% by weight, on drying for two hours at 105° C.

EXAMPLES

The following examples are provided to explain and illustrate the preferred embodiments of the present disclosure and do not in any way limit the scope of the disclosure as described:

Example 1: Process of Preparing Precipitated Silica in Accordance with Present Disclosure Sodium silicate solution used for the silica synthesis has a solid content of ~30.1% by wt. (Na$_2$O to SiO$_2$ ratio=1:3.1, silica percentage by wt.=23%, Na$_2$O percentage by wt.=7.1%). This solution has a pH value of 12.5±0.5.
1.25 M sulphuric acid solution was prepared by adding slowly 680 mililitre of concentrated sulphuric acid (% of sulphuric acid in the solution=98%, Sp. Gr. of the solution=1.84) to distilled water to make 10 litre solution.
To prepare the surfactant solution, 600 mililitre of distilled water was heated at 50-60° C. 7.5 grams of gelatin is added and stirred to dissolve gelatin in water. 11.2 mililitre of C8 to C20 sulfosuccinate blend surfactant was further added to the above solution and stirred to mix.
In order to synthesize precipitated silica, 3 litres of distilled water was taken in a properly cleaned 25 litre jacketed reactor. The heater was set at 95° C. and the stirrer of the reactor was set at a stirring rate of 400 rpm. In the first stage, 3 litres of 1.25 M sulphuric acid and 3 litres of sodium silicate solutions were taken in two separate beakers. 300 millilitre of surfactant solution was slowly added to the reactor while mixing. Three metering pumps were calibrated: 1$^{st}$ for acid, 2$^{nd}$ for sodium silicate addition and 3$^{rd}$ for water addition. The addition rate of all the three pumps was set at 30 millilitres/minute. When the temperature of the reactor reached 95° C., the sodium silicate pump and the water metering pump were switched on simultaneously. Sodium silicate and water were then pumped at an addition rate of 30 millilitres/minute for 10 minutes to the reaction chamber. The pH of the solution in the reaction chamber was checked. At this point, it was ensured that the pH of the reaction mixture is between pH 9.7 to 10. Further on, the reaction was carried out in two stages. In the first stage, the sulphuric acid metering pump was switched on and sulphuric acid solution was added at an addition rate of 30 millilitres/minute to the reaction chamber, while continuing the addition of both sodium silicate and water at the addition rate of 30 millilitres/minute. The reaction mixture is stirred at 400 rpm. After 30 minutes, the addition of sulphuric acid, sodium silicate and water were stopped while continuing the stirring at 400 rpm and 95° C. reactor temperature. The reaction mixture was then allowed to age for 30 minutes. The pH of the solution in the reaction chamber was checked. At this point, it was ensured that the pH of the reaction mixture is between pH 9.7 to 10. In the second stage, 300 millilitres of the surfactant solution was added to the reactor. The addition of sulphuric acid and sodium silicate was started at the addition rate of 30 millilitres/minute and water at the addition rate of 45 millilitres/minute while stirring at 95° C. for next 60 minutes. The pH of the solution in the reaction chamber was checked. It was ensured that the pH of the reaction mixture is between pH 9.7 to 10. The addition of sulphuric acid, sodium silicate and water were stopped. The reaction mixture was allowed to age for another 70 minutes while stirring at 95° C. After 70 minutes of aging, sulphuric acid was added to the reaction mixture at 100 millilitres/minute. The pH was measured till the reaction mixture attained a pH of 4.0-4.7. After pH adjustment, the addition of sulphuric acid was stopped. The reaction mixture was allowed to age for 1 hour at 95° C. with continuous stirring.
At the end of the reaction, the precipitates were collected from the reactor. The precipitate was centrifuged at 4000 rpm for 5 minutes. The cake was collected and washed thoroughly with approximately 5 litre of distilled water to remove sodium sulphate. The solid content of the wet cake thus obtained was checked and found to be 12-15% by drying at 125° C. 2-4% (w/w) metal salt of saturated and unsaturated fatty esters with long hydrocarbon chain/fatty acids was added to the silica cake as dispersing agent followed by homogenization. Silica cake was then spray dried to powder. The moisture content of spray dried silica should be in the range of 2-5%. Post synthesis, a detailed characterization of synthesized precipitated silica was carried out. The properties were tabulated in the below table, table 1.

TABLE 1

Properties of precipitated silica of the present disclosure

| Sr. No. | Properties | Units | Value | Method |
|---|---|---|---|---|
| 1 | Appearance | | White fluffy powder | |
| 2 | Crystal structure | | Amorphous | X-ray Diffraction |
| 3 | Surface area (N2) | $m^2/g$ | 160 | Multipoint-BET $N_2$ absorption method |
| 4 | CTAB surface area (CTAB) | $m^2/g$ | 140 | CTAB surface area (ASTM 3765) |
| 5 | DBP absorption value | ml/100 g $SiO_2$ | 320 | Oil absorption tester (ASTM D 2414) |
| 6 | Sears Number | ml/(5 g) | 25 | Method used as per U.S. Pat. No. 7,871,588 |
| 7 | CDBP coeffficient ($D_A$) | Number | 0.69 | ASTM D-3493 |
| 8 | BET/ CTAB surface area | Number | 1.142 | — |
| 9 | Sears number/CTAB surface area | ml/5 $m^2$ | 0.178 | — |

Example 2: Process of Preparing Precipitated Silica in Accordance with Present Disclosure Sodium silicate solution was prepared by mixing 6 kilograms of sodium silicate (Solid content ~45.5% by wt.; $Na_2O$ to $SiO_2$ ratio=1:2.5; $SiO_2$% by wt.=32.5%) in 6 litre of distilled water with stirring at 400 RPM for 15 minutes. The obtained sodium silica solution has a pH value of 12.5±0.5. Further, 1.25 M sulphuric acid solution is prepared by adding slowly 680 millilitres of concentrated sulphuric acid (% of sulphuric acid in the solution=98%, Sp. Gr of the solution=1.84) to distilled water to make 10 litre solution. The 1.25 M sulphuric acid solution is diluted 2 times by mixing 1.5 litre of 1.25 M sulphuric acid solution and 1.5 litre of water. The resultant sulphuric acid solution has a molarity of 0.625 M and pH 1±0.3. Gelatin and C8-C20 sulfosuccinate blend surfactant is prepared by first taking 600 millilitres of distilled water and heating it up to 50-60° C. followed by adding to it 3.75 grams of gelatin. The resultant mixture is stirred to dissolve gelatin in water. Subsequently, 5.6 millilitre of C8-C20 sulfosuccinate blend surfactant is added to it followed by stirring to obtain gelatin and C8-C20 sulfosuccinate blend surfactant.

To prepare precipitated silica, 3 litre of distilled water is taken in a properly cleaned 25 litre jacketed reactor connected to a heater. The heater and stirrer of the reactor are set at temperature of 95° C. and stirring rate of 400 rpm respectively. 600 ml of gelatin and C8-C20 sulfosuccinate blend surfactant is added to the reactor when temperature thereof reaches 70° C. Further, the reaction mixture in the reactor reaches 95° C., 3 litre of 0.625 M sulphuric acid solution and 3 litre of sodium silicate solution are simultaneously added thereto at an addition rate of 30 millilitres/ minute. This reaction mixture was stirred at 400 rpm. After completion of the addition, the pH of the reaction mixture was checked. At the end of the reaction, pH should be 10±0.3. Once pH of 10±0.3 is obtained in the reaction mixture, 1.25 M sulfuric acid solution is added to the reactor to adjust the pH of the reaction mixture to 2±0.5 followed by addition of 5% NaOH solution to bring the pH to 4±0.5. Thereafter, the solution mixture was aged/maintained at 95° C. for 1 hour while stirring at 400 rpm. At the end of the reaction, precipitate was collected from the reactor.

The precipitate was centrifuged at 4000 rpm for 5 minutes. The filter cake thus obtained was collected and washed thoroughly with approximately 5 litre of distilled water to remove sodium sulphate. The solid content of the wet cake was checked and found to be 12-15% by drying at 125° C. A dispersion of 6-10% solid content was prepared thereafter by adding distilled water to obtain silica slurry. Once silica slurry is prepared, metal salt of saturated and unsaturated fatty esters with long hydrocarbon chain/fatty acids was used as dispersing agent with a 2-4% w/w loading in an appropriate solvent (e.g. butanol, butanone, toluene and acetone) and added slowly to the 6-10% silica slurry by homogenizing in a high shear mixer for 15 minutes at 2000 rpm. The 6-10% silica slurry was then spray dried to powder. The moisture content of spray/spin flash dried silica should be in the range of 2-5%. Post synthesis, a detailed characterization of synthesized precipitated silica was carried out. The properties were tabulated in the below table, table 2.

TABLE 2

Properties of precipitated silica of the present disclosure

| Sr. No. | Properties | Units | Value | Method |
|---|---|---|---|---|
| 1 | Appearance | | White fluffy powder | |
| 2 | Crystal structure | | Amorphous | X-ray Diffraction |
| 3 | Surface area ($N_2$) | $m^2/g$ | 140 | Multipoint-BET $N_2$ absorption method |
| 4 | CTAB surface area (CTAB) | $m^2/g$ | 125 | CTAB surface area (ASTM 3765) |
| 5 | DBP absorption value | ml/100 g $SiO_2$ | 280 | Oil absorption tester (ASTM D 2414) |
| 6 | Sears Number | ml/(5 g) | 26 | Method used as per U.S. Pat. No. 7,871,588 |

TABLE 2-continued

Properties of precipitated silica of the present disclosure

| Sr. No. | Properties | Units | Value | Method |
|---|---|---|---|---|
| 7 | CDBP coeffficient ($D_A$) | Number | 0.7 | ASTM D-3493 |
| 8 | BET/ CTAB surface area | Number | 1.12 | — |
| 9 | Sears number/CTAB surface area | ml/5 m$^2$ | 0.208 | — |

We claim:

1. A precipitated silica having:
a BET/CTAB in a range of 0.8-1.35;
a DBP oil absorption in a range of 240-320 ml/100 g; and
a CDBP coefficient (DA) in range of 0.65 to 0.9,
wherein the precipitated silica has a micro pore area ranging from 6 to 35 m$^2$/g and a micro pore volume ranging from 0.01 to 0.06 cm$^3$/g.

2. The precipitated silica as claimed in claim 1, having the BET/CTAB in the range of 1.1 to 1.25.

3. The precipitated silica as claimed in claim 1, having the DBP oil absorption in the range of 280-320 ml/100 g.

4. The precipitated silica as claimed in claim 1, having a BET surface area in a range of 100-250 m$^2$/g.

5. The precipitated silica as claimed in claim 1, having a CTAB surface area in a range of 80-30 m$^2$/g.

6. The precipitated silica as claimed in claim 1, having a sears number (V2) in a range of 10 to 30 ml/(5 g).

7. The precipitated silica as claimed in claim 1, having a Wk coefficient number less than 3.

8. The precipitated silica as claimed in claim 1, having an average primary particle size ranging from 8 to 50 nm.

9. The precipitated silica as claimed in claim 1, having an average particulate aggregate size ranging from 50 to 3000 nm.

10. The precipitated silica as claimed in claim 1, having a pore diameter ranging from 250 Å to 350 Å.

11. The precipitated silica as claimed in claim 1, having a moisture loss of 2 to 6% by weight, on drying for two hours at 105° C.

12. The precipitated silica as claimed in claim 1, having a pH value in the range of 6-6.5.

13. The precipitated silica as claimed in claim 1, having a soluble salt content of less than 1%.

14. The precipitated silica as claimed in claim 1, having a zeta potential in the range of −20 mV to −50 mV.

15. The precipitated silica as claimed in claim 1, having an electrical conductivity less than 1300 μS/cm.

\* \* \* \* \*